United States Patent [19]

Choi et al.

[11] Patent Number: 5,781,370
[45] Date of Patent: Jul. 14, 1998

[54] TAPE CASSETTE HOLDER SEPERATING MECHANISM OF MAGNETIC RECORDING AND REPRODUCING APPARATUS HAVING MULTIPLE THREAD WORM FOR PERMITTING MOVING OF THE CASSETTE HOLDER WHEN UNPOWERED

[75] Inventors: Jeong Don Choi; In Ki Cheon, both of Seoul; Geun Hyuk Song, Kyungki-do; Hee Yoon Park, Seoul, all of Rep. of Korea

[73] Assignee: Goldstar Co., Ltd., Seoul, Rep. of Korea

[21] Appl. No.: 780,384

[22] Filed: Jan. 8, 1997

Related U.S. Application Data

[63] Continuation of Ser. No. 494,762, Jun. 26, 1995, abandoned, which is a continuation of Ser. No. 155,155, Nov. 19, 1993, abandoned.

[30] Foreign Application Priority Data

Nov. 21, 1992 [KR] Rep. of Korea ................ 1992 23012

[51] Int. Cl.$^6$ .................................................. G11B 15/675
[52] U.S. Cl. ........................................ 360/96.5; 242/338.4
[58] Field of Search .......................... 360/96.5, 93, 69, 360/71, 137; 242/338.4

[56] References Cited

U.S. PATENT DOCUMENTS

| | | |
|---|---|---|
| 3,972,073 | 7/1976 | Bara .................................... 360/93 |
| 4,173,028 | 10/1979 | Hyodo .................................. 360/69 |
| 4,661,867 | 4/1987 | Tsubota ............................... 360/96.5 |
| 4,685,009 | 8/1987 | Uin et al. ............................ 360/96.5 |
| 4,761,697 | 8/1988 | Hashiguchi et al. ................. 360/96.5 |
| 4,985,791 | 1/1991 | Yamagishi ........................... 360/96.5 |
| 4,992,895 | 2/1991 | Kim .................................... 360/96.5 |
| 5,021,904 | 6/1991 | Shimizu et al. ..................... 360/96.5 |
| 5,043,832 | 8/1991 | Ueda et al. .......................... 360/96.5 |
| 5,105,317 | 4/1992 | Sugiyama et al. ................... 360/71 |
| 5,253,941 | 10/1993 | Kamoda .............................. 400/692 |
| 5,386,329 | 1/1995 | Ikegawa .............................. 360/96.5 |

FOREIGN PATENT DOCUMENTS 61-123046  6/1985  Japan ................................. 360/96.5

*Primary Examiner*—Craig A. Renner
*Attorney, Agent, or Firm*—Birch, Stewart, Kolasch & Birch, LLP

[57] ABSTRACT

A front loading device of a magnetic recording and reproducing apparatus comprises a plurality of gears gearing into each other, a worm and a worm gear. One of the plurality of gears engages with an arm gear moving a cassette holder. The worm and the worm gear engage with each other in order to reversibly rotate each other. The worm is coaxially connected to a loading motor in order to cooperate with the loading motor, and the worm gear is integrally formed with another one of the plurality of gears. The device allows a cassette along with the cassette holder to smoothly move inward along a guide opening of a bracket when the cassette is mistakenly inserted into the cassette holder and forcibly pushed such as by a child under the condition that a loading motor is applied with no electric power. Damage to the elements of the device is thereby prevented.

6 Claims, 2 Drawing Sheets

1

TAPE CASSETTE HOLDER SEPERATING MECHANISM OF MAGNETIC RECORDING AND REPRODUCING APPARATUS HAVING MULTIPLE THREAD WORM FOR PERMITTING MOVING OF THE CASSETTE HOLDER WHEN UNPOWERED

This application is a continuation of application Ser. No. 08/494,762 filed on Jun. 26, 1995, now abandoned, which is a continuation of application Ser. No. 08/155,155 filed on Nov. 19, 1993, now abandoned.

BACKGROUND OF THE INVENTION

1. Field of the Invention

The present invention relates to a front loading device of a magnetic recording and reproducing apparatus, and more particularly to a front loading device of the magnetic recording and reproducing apparatus capable or preventing of damage to its elements even in the case of forcible misinsertion of a tape cassette into the device.

2. Description of the Prior Art

As is well known to those skilled in the art, when a tape cassette is normally inserted into a cassette holder of a conventional front loading device of a magnetic recording and reproducing apparatus, a sensing switch placed inside the cassette holder senses insertion of the cassette into the holder and outputs a signal to a motor control unit such that this control unit starts a loading motor. The rotational force of the loading motor is applied to an arm gear through a transmission gear train comprising a plurality of transmission gears, thus rotating this arm gear. When the arm gear is rotated as described above, the cassette holder receiving the cassette moves inward along a guide opening of a bracket in order to reach a predetermined loading position on the deck mechanism of the apparatus, thus loading the cassette on a reel table mounted on a base plate of the deck mechanism.

In addition, the above front loading device has a self-locking function in that a worm and a worm gear of the transmission gear train generates a self-locking force when the loading motor is applied with no electric power such as due to separation of a plug of the apparatus from a power source receptacle, so that there is no cassette loading operation of the device. However, a person such as child who does not know how to treat the magnetic recording and reproducing apparatus may insert the tape cassette into the cassette holder and push the cassette by force regardless of the above self-locking function of the device, thus resulting in serious damage to the elements of the device.

SUMMARY OF THE INVENTION

It is, therefore, an object of the present invention to provide a front loading device of a magnetic recording and reproducing apparatus in which the aforementioned problem can be overcome and which allows a cassette holder together with a tape cassette to smoothly move inward along a guide opening of a bracket when the cassette is mistakenly inserted into the cassette holder and forcibly pushed such as by child under the condition that a loading motor is applied with no electric power such as by separation of a plug from a power source receptacle, thus preventing damage to the elements of the device.

In order to accomplish the above object, a front loading device of a magnetic recording and reproducing apparatus in accordance with the present invention comprises a plurality of gears gearing into each other, one of the gears gearing into an arm gear moving a cassette holder; and a worm and a worm gear gearing into each other in order to reversibly rotate each other, the worm being coaxially connected to a loading motor in order to cooperate with the loading motor, and the worm gear being integrally formed with another one of the plurality of gears.

In an embodiment, the plurality of gears comprises an idle gear gearing into the arm gear, a connection gear gearing into the idle gear, and a loading gear gearing into the connection gear, the loading gear being integrally formed with the worm gear.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and other advantages of the present invention will be more clearly understood from the following detailed description taken in conjunction with the accompanying drawings which are given by way of illustration only, and thus are not limitative of the present invention, and in which.

DESCRIPTION OF THE PREFERRED EMBODIMENTS

Figure 1:
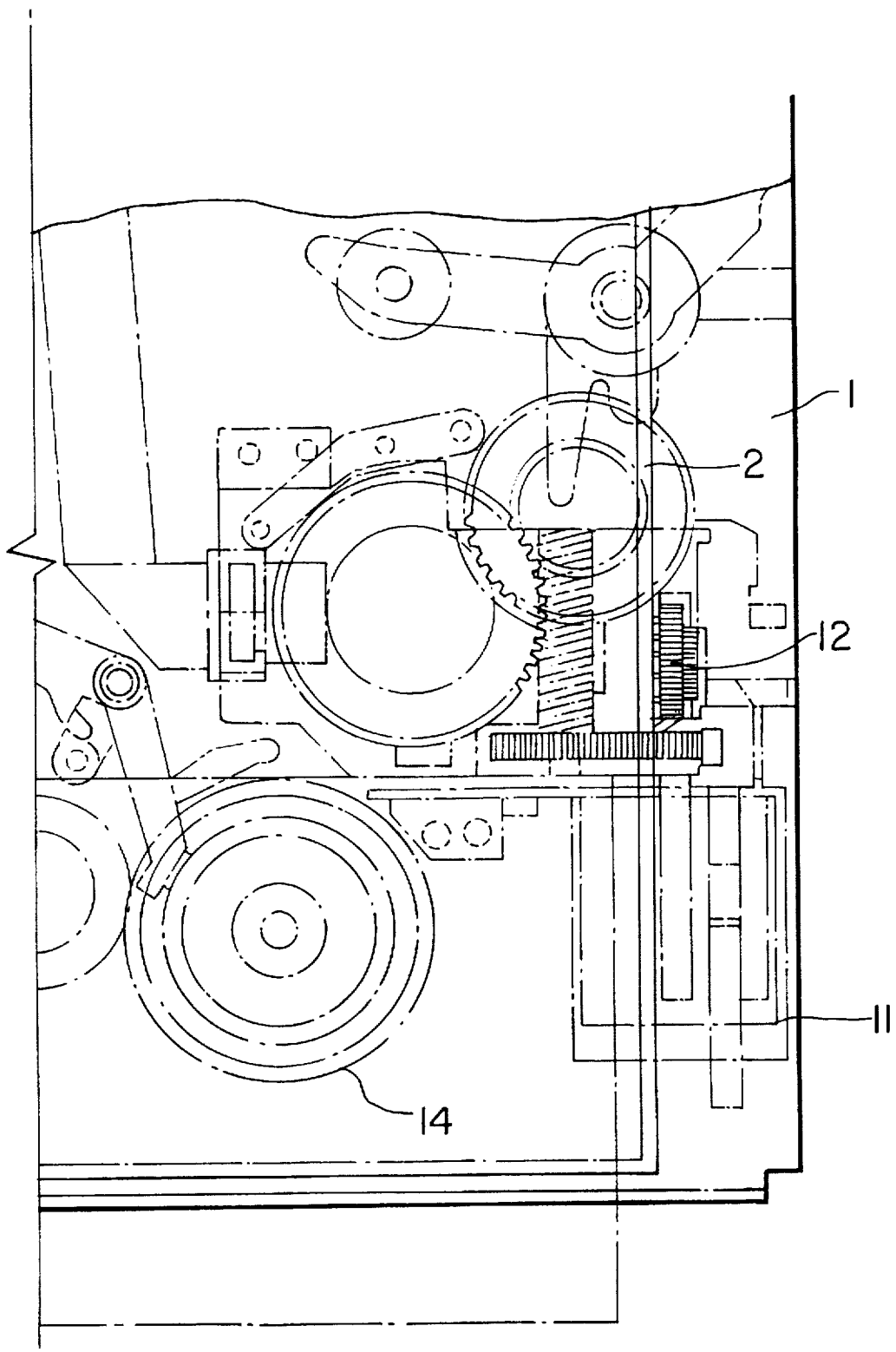
FIG. 1 is a plan view showing a front loading device according to a primary embodiment of the present invention, installed on a base plate of a deck mechanism of a magnetic recording and reproducing apparatus.
Figure 2:
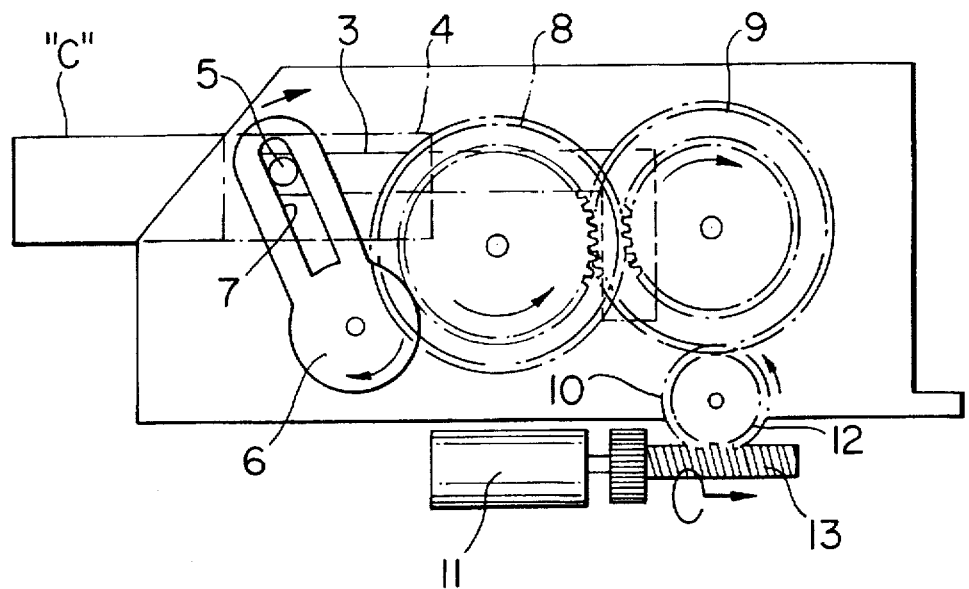
FIG. 2 is an enlarged side view of the front loading device of FIG. 1.

FIG. 1 shows a front loading device according to a primary embodiment of the present invention installed on a base plate 1 of a deck mechanism of a magnetic recording and reproducing apparatus, and FIG. 2 shows the front loading device of the primary embodiment. As shown in these drawings, a pair of brackets 2 are mounted on opposed sides of the base plate 1 such that the brackets 2 are parallel to each other. Please note that one of the pair of brackets 2 is shown in the drawings. Each of the brackets 2 is provided with an L-shaped guide opening 3 which receives a guide pin 5 of a cassette holder 4 placed inside the bracket 2. Hence, the cassette holder 4 moves horizontally and vertically along the guide opening 3 of the bracket 2.

As shown in FIG. 2, an arm gear 6 is rotatably mounted on the bracket 2. This arm gear 6 has an arm section having a longitudinal opening 7 which receives the guide pin 5 of the cassette holder 4 such that the guide pin 5 slides along the opening 7. In addition, the bracket 2 rotatably supports an idle gear 8 and a connection gear 9 which gear into each other. The connection gear 9 also gears into a loading gear 10.

A loading motor 11 is mounted on a side of the base plate 1. The loading motor 11 is coaxially coupled at its output shaft to a worm 13 which gears into a worm gear 12 integrally concentrically formed with the loading gear 10.

The worm 13 gearing into the worm gear 12 is a triple-threaded worm and has a wide lead angle such that it is smoothly rotated when the worm gear 12 is rotated.

When a tape cassette C is normally inserted into the cassette holder 4 such as during a reproducing mode of the apparatus, a sensing switch (not shown) placed inside the cassette holder 4 senses insertion of the cassette C into the holder 4 and outputs a signal to a motor control unit (not shown) in order to start the loading motor 11. Upon rotation of the loading motor 11, the rotational force of the loading motor 11 is directly applied to the worm 13 coupled to the output shaft of the motor 11, thus rotating this worm 13. Hence, the worm gear 12 gearing into the worm 13 is rotated counterclockwise and this rotates in the same direction the loading gear 10 integrally concentrically formed with this worm gear 12. As a result of counterclockwise rotation of the loading gear 10, the connection gear 9 and the idle gear 8 are rotated. The arm gear 6 gearing into the idle gear 8 is thus rotated clockwise by the rotational force of the loading motor 11. The clockwise rotation of the arm gear 6 causes inward movement of the cassette holder 4 together with the cassette C along the guide opening 3 of the bracket 2 as shown by the arrow of FIG. 2. That is, the cassette holder 4 receiving the cassette C moves inward in order to reach a predetermined loading position on the deck mechanism, thus loading the cassette C on a reel table 14 mounted on the base plate 1.

In order to eject the cassette C from the loaded position on the reel table 14, an eject button (not shown) is pushed in order to rotate the loading motor 11 in a reversed direction. As a result of the reverse rotation of the motor 11, the rotational force of the motor 11 is transmitted to the arm gear 6 and rotates this arm gear 6 counterclockwise, thus moving the cassette holder 4 along with the cassette C outward and to achieving ejection of the cassette C.

In accordance with the front loading device of the present invention, the tape cassette C can smoothly move inward together with the cassette holder 4 when a person such as child who does not know how to treat the magnetic recording and reproducing apparatus inserts the tape cassette C into the cassette holder 4 and pushes the cassette C by force under the condition that the loading motor is applied with no electric power such as due to separation of a plug of the apparatus from a power source receptacle. When the cassette C is inserted into the cassette holder 4 and forcibly pushed as described above, the cassette holder 4 moves inward and this causes rotations of the gears 6, 8, 9 and 10 as shown by the arrows of FIG. 2. The counterclockwise rotation of the loading gear 10 is attended with rotation of the worm gear 12 in the same direction. The worm 13 gearing into the worm gear 12 is thus rotated and, as a result, the loading motor 11 applied with no electric power is rotated. Hence, the cassette C together with the cassette holder 4 can smoothly move inward until the pushing force applied thereto is removed. When the pushing force applied to the cassette C is removed, the rotations of the elements of the device are stopped and the cassette C stops at its position.

As described above, the front loading device of this invention allows the tape cassette C to smoothly move inward together with the cassette holder 4 even when a person such as child who does not know how to treat the apparatus inserts the cassette C into the cassette holder 4 and pushes the cassette C by force under the condition that the loading motor 11 is applied with no electric power. Therefore, the device reliably prevents its elements from being damaged by the cassette C inserted mistakenly.

When the front loading device is normally applied with the electric power under the condition that the cassette C together with the cassette holder 4 is placed on a middle section of the deck mechanism, the location of the cassette C is sensed such as by a micro switch and the cassette C together with the cassette holder 4 automatically returns to its initial position, that is, the cassette eject position.

Figure 3:
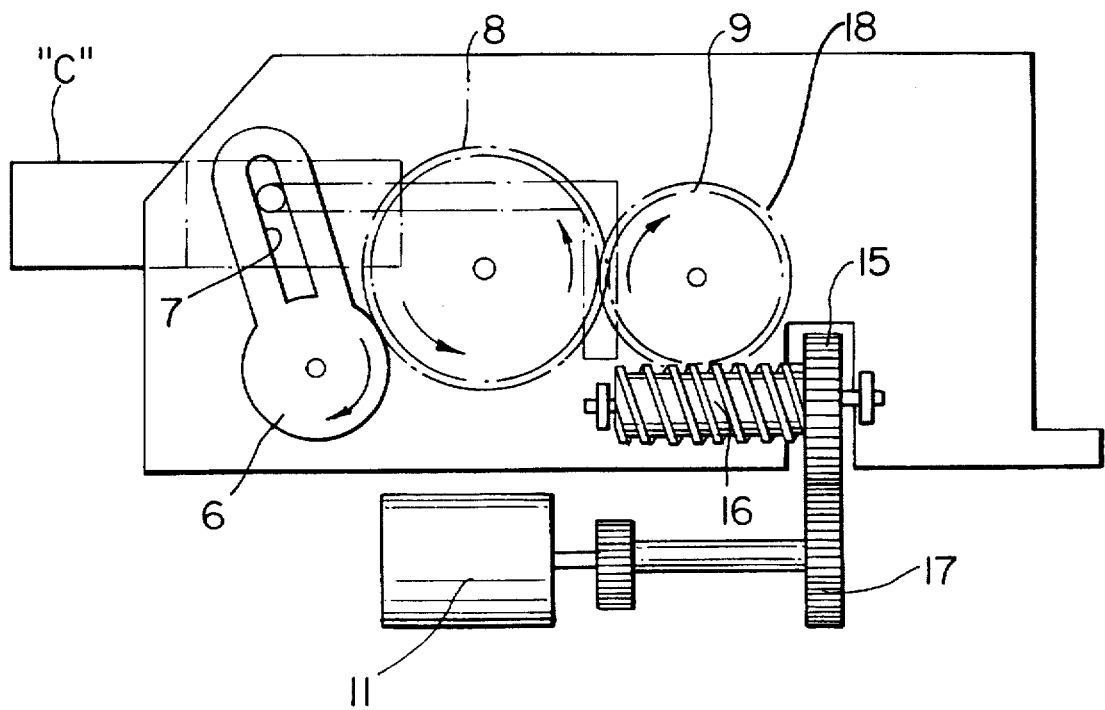
FIG. 3 is an enlarged side view of a front loading device in accordance with a second alternate embodiment of the present invention.

Turning to FIG. 3, there is shown a front loading device in accordance with a second alternate embodiment of the present invention. In this second embodiment, a worm 16 integrally connected to a first spur gear 15 is rotatably mounted on the bracket 2. The worm 16 can be triple-threaded worm and gears into a worm gear 18 integrally formed with a connection gear 9 which in turn gears into an idle gear 8. In the same manner as described for the primary embodiment, this idle gear 8 gears into an arm gear 6. The first spur gear 15 gears into a second spur gear 17 which is coaxially coupled to the output shaft of a loading motor 11 such that it is rotated by the rotational force of the motor 11.

In the front loading device according to the primary embodiment shown in FIGS. 1 and 2, the distance between the arm gear 6 and the worm 13 is relatively long such that the force, applied to the worm 13 when the cassette C is forcibly pushed inward in the state of no electric power applied to the loading motor 11, is weak. In this regard, the worm 13 may not be smoothly rotated and, as a result, the desired smooth insertion of the cassette C may not be achieved. Meanwhile, the distance between the arm gear 6 and the worm 16 of the front loading device according to the second embodiment is relatively short such that the force, applied to the worm 16 when the cassette C is forcibly pushed inward in the state of no electric power applied to the loading motor 11, is strong. In this regard, the worm 16 can be smoothly rotated and, as a result, the desired smooth insertion of the cassette C can be achieved.

As described above, a front loading device according to the present invention allows a tape cassette to smoothly move inward together with a cassette holder even when a person such as child who does not know how to treat magnetic recording and reproducing apparatus inserts the cassette into the cassette holder and pushes the cassette by force under the condition that a loading motor is applied with no electric power. Therefore, the device reliably prevents its elements from being damaged by the inserted and pushed cassette, thus improving the reliability of the magnetic recording and reproducing apparatus.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A gear/worm arrangement in a front loading device of a magnetic recording and reproducing apparatus having a cassette holder for receiving a cassette thereon, comprising:

an arm gear connected to the cassette holder by means of a guide pin guided through a guide opening;

a plurality of gears meshed with each other, a first gear of said plurality of gears meshing with said arm gear; and a multiple threaded worm, having a wide lead angle, connected to a reversible motor and meshed with a second gear of said plurality of gears, whereby a rotational force of the reversible motor generated when power is supplied thereto is transferred through said multiple threaded worm and said plurality of gears to said arm gear for moving the cassette holder;

said arm gear, said plurality of gears, said multiple threaded worm, and the reversible motor being rotatable in response to the force of manual insertion of the cassette onto the cassette holder when power is not supplied to the reversible motor so as to prevent damage to said gear/worm arrangement.

2. The gear/worm arrangement according to claim 1, wherein said multiple threaded worm is a triple-threaded worm.

3. A gear/worm arrangement in a front loading device of a magnetic recording and reproducing apparatus having a cassette holder for receiving a cassette thereon, comprising:

an arm gear having a longitudinal opening therein for receiving a guide pin of the cassette holder, said arm gear rotating in order to linearly move the cassette holder;

an idler gear meshed with said arm gear;

a connection gear meshed with said idler gear in order to be rotated in the same direction as that of said arm gear;

a multiple threaded worm and worm gear meshed with each other in order to rotate with each other, said worm gear being integrally and concentrically formed with said connection gear, said multiple threaded worm having a wide lead angle, and a plurality of spur gears meshed with each other, a first spur gear of said plurality of spur gears being connected to said multiple threaded worm in order to be rotated together with said multiple threaded worm, and a second spur gear of said plurality of spur gears being connected to a reversible motor in order to cooperate with the reversible motor;

the cassette holder being transported in a loading direction and an ejecting direction of the cassette by the transfer of a rotating force of the reversible motor from said multiple threaded worm to said worm gear upon a supply of power to the reversible motor;

said arm gear, said idler gear, said connection gear, said worm gear, said multiple threaded worm, said plurality of spur gears, and the reversible motor being rotatable under the force of manual insertion of the cassette onto the cassette holder when power is not supplied to the reversible motor.

4. The gear/worm arrangement according to claim 3, wherein said multiple threaded worm is a triple-threaded worm.

5. The gear/worm arrangement according to claim 3, wherein said plurality of spur gears include only said first spur gear and said second spur gear, wherein said second spur gear, said first spur gear, said multiple threaded worm, said worm gear, said connection gear, said idler gear and said arm gear are directly connected in sequence and are the only driving connections between the second spur gear and the arm gear.

6. The gear/worm arrangement according to claim 3, wherein said multiple threaded worm, said worm gear, said connection gear, said idler gear and said arm gear are directly connected in sequence and are the only driving connections between said multiple threaded worm and the arm gear.

* * * * *